United States Patent [19]
Fabris et al.

[11] 3,928,502
[45] Dec. 23, 1975

[54] PROCESSABLE NON-BURNING ABS-PVC BLENDS

[75] Inventors: Hubert J. Fabris, Akron; Wendell O. Phillips, Stow, both of Ohio

[73] Assignee: The General Tire & Rubber Company, Akron, Ohio

[22] Filed: Aug. 4, 1971

[21] Appl. No.: 169,081

[52] U.S. Cl.... 260/891; 260/45.75 R; 260/45.75 K; 260/876 R
[51] Int. Cl.². C08K 3/22; C08L 9/02; C08L 27/06
[58] Field of Search............ 260/891, 893, 45.75 R, 260/45.75 K

[56] References Cited
UNITED STATES PATENTS

| | | | |
|---|---|---|---|
| 2,610,920 | 10/1952 | Hopkinson | 260/45.75 R |
| 3,063,961 | 11/1962 | Frank | 260/894 |
| 3,367,997 | 2/1968 | Smith | 260/891 |

*Primary Examiner*—Murray Tillman
*Assistant Examiner*—J. Ziegler

[57] ABSTRACT

Processable blends of ABS polymers and PVC polymers in weight ratios of 60:40 to 40:60 are rendered non-burning by the incorporation of at least 2 parts by weight of stannic oxide per 100 parts by weight of total polymers.

8 Claims, No Drawings

PROCESSABLE NON-BURNING ABS-PVC BLENDS

BACKGROUND OF THE INVENTION

Blends of acrylonitrile-butadiene-styrene terpolymers, generally referred to as ABS polymers, and vinyl chloride polymers, generally referred to as PVC, have come into substantial commercial use in blow molding and vacuum forming such products as power tool housings and aircraft wall panels. Efforts have been made to render such blends frame-resistant using a wide variety of metal oxides, the preferred metal oxide being antimony trioxide, which has long been used as a fire retardant for plastic materials especially in the presence of halogen donors such as polyvinyl chloride. It has been found that blends of ABS polymers and PVC in weight ratios of 30:70 and less have a natural resistance to flame without any additives, but such blends are very difficult to form or otherwise process. Blends of ABS polymers and PVC polymers in approximately equal weights have excellent processability, but they have no significant flame resistance. Even with most of the metal oxides normally used to impart flame resistance these blends are at best self-extinguishing.

SUMMARY OF THE INVENTION

This invention comprises compositions of matter which are blends consisting essentially of (A) ABS type polymers and (B) PVC type polymers in weight ratios of from about 60:40 to 40:60 containing at least about 2, preferably about 5, parts by weight of (C) stannic oxide per 100 parts by weight of total polymers.

More specifically, the compositions of this invention are blends consisting essentially of (A) terpolymers of monomers of which 20 to 40 weight percent is butadiene-1,3 and/or isoprene, 15 to 35 weight percent is acrylonitrile and/or methacrylonitrile, and 35 to 55 weight percent is styrene and/or alphamethylstyrene, (B) chlorinated saturated aliphatic hydrocarbon polymers containing an average of from about 0.4 to about 1 chlorine atom per carbon atom, components (A) and (B) being in a weight ratio from about 60:40 to 40:60, and (C) stannic oxide in an amount of at least about 2 parts by weight per 100 parts by weight of total polymers (A) and (B). There are preferably as a practical matter no more than about 12 parts by weight of stannic oxide per 100 parts of total polymers (A) and (B). Materials such as compounding and processing aids and other additives can also be present.

DESCRIPTION OF THE PREFERRED EMBODIMENTS

The ABS terpolymers (A) employed in the blends of this invention are preferably terpolymers prepared from monomers of which 20 to 40 weight percent, preferably about 30 weight percent, is butadiene-1,3, 15 to 35 weight percent, preferably about 25 weight percent, is acrylonitrile and 35 to 55 weight percent, preferably about 45 weight percent, is styrene. The usual variation in monomers which can be and are employed in ABS type polymers generally can also be employed in the ABS type polymers employed in this invention. These terpolymers are thermoplastic vacuum-formable resins having excellent solvent resistance and excellent heat distortion characteristics.

In order to be of use in this invention the terpolymers should have a heat distortion temperature in the range of about 195° to 245°F., preferably about 199° to 220°F. The ABS type polymers can be terpolymers of the type described generally in U.S. Pat. No. 3,367,997 or can be graft copolymers of the type described in U.S. Pat. No. 2,802,809. Presently available commercial ABS polymers are designated for use with PVC polymers.

The PVC type polymers (B) employed in the blends of this invention are preferably homopolymers or copolymers of vinyl chloride and/or vinylidene chloride. Such polymers include, for example, homopolymers of vinyl chloride, homopolymers of vinylidene chloride, copolymers of vinylidene chloride and vinyl chloride, equivalent chlorinated hydrocarbons and copolymers of vinyl chloride and ethylenically unsaturated monomers copolymerizable therewith such as vinylidene bromide, ethylene, propylene, isobutylene, allyl acetate, allyl chloride, vinyl acetate, acrylonitrile, styrene and maleic, fumaric and acrylic acid esters. Such polymers are described more fully in the aforementioned U.S. Pat. No. 2,802,809. For the purposes of this invention the PVC type polymers employed herein should contain at least 0.4 chlorine atom per carbon atom, preferably about 0.5 to 0.7 chlorine atom per carbon atom, but no more than about one chlorine atom per carbon atom.

The PVC type polymers employed in the blends of this invention are preferably finely divided (powder having a maximum dimension ranging from about 0.0001 to 2 mm.) and have an intrinsic viscosity of from about 0.25 to 2.5, preferably from about 0.5 to 1.5. These polymers can be made by bulk, solvent, emulsion or suspension polymerization processes, preferably the suspension polymerization process.

The stannic oxide (C) employed in the blends of this invention is a powdery solid which is readily dispersible in the claimed blends of polymeric components (A) and (B). As a practical matter, the stannic oxide has a particle size such that it will pass through a 200 mesh screen (U.S. Sieve Series).

The weight ratio of component (A) to component (B) is preferably as low as possible, but for the purposes of this invention the weight ratio must be at least about 40:60 to give a polymer blend having satisfactory processability and vacuum formability. Such blends have a natural resistance to burning, but at least about 2 parts by weight of stannic oxide per 100 parts of total (A) and (B) are necessary to reduce burn time to zero by the test method employed. As the weight ratio of component (A) to component (B) increases, more stannic oxide is needed to maintain resistance to burning of the total blend. The maximum weight ratio of (A) to (B) is about 60:40 for the purposes of this invention, and a weight ratio of 50:50 is preferred. The maximum amount of stannic oxide which satisfies the objects of this invention is a practical limitation, 12 parts by weight of stannic oxide per 100 parts of total (A) and (B) being a reasonable upper limit.

In addition to components (A), (B) and (C), the blends of this invention can contain up to about 6 weight percent of the total blend of additional ingredients, such as stearic acid in amounts of about 0.5 to 1.5 parts by weight per 100 parts of polymer and barium-cadmium (or other type) heat stabilizer in amounts of about 1.0 to 4.5 parts by weight per 100 parts of polymer.

The compositions of this invention are useful for blow molding or vacuum forming power tool housings, aircraft wall panels, containers and the like.

The following example is illustrative of the best presently-known methods of practicing the subject invention and is not intended to limit the invention, the scope of which is properly delineated in the claims. All quantitative measurements are in parts by weight unless otherwise noted.

EXAMPLE

In this example the polymeric components were:
A. a high impact ABS polymer within the parameters above sold commercially under the mark Kralastic 3100 by Uniroyal Corp. for use as a modifier for PVC polymers, and
B. polyvinyl chloride having an intrinsic viscosity of 1.03.

A dry blend of 50 parts of component (A), 50 parts of component (B), 1 part of stearic acid processing aid and 1.5 part of a barium-cadmium heat stabilizer was prepared and mixed until completely homogeneous. Separate samples of this blend were blended in a Waring blender with various metal oxides in the amounts shown below to effect homogeneity and then were milled and pressed into sheets for flammability testing based on Burn Time using Method 5903, Federal Test Method Standard No. 191, Vertical Flame Test, 12 Second Ignition.

TABLE I

| Metal Oxide | Amount (pts. per 100 parts of total polymer) | Burn Length (inches) | Burn Time (seconds) | Rating |
|---|---|---|---|---|
| Cupric Oxide | 2.73 | 8.5 | 60 | B/SE |
| Cupric Oxide | 5.0 | 5.9 | 48 | B/SE |
| Aluminum Trioxide | 1.75 | 1.5 | 12 | SE |
| Aluminum Trioxide | 5.0 | 3.9 | 63 | B/SE |
| Stannic Oxide | 5.0 | 1.6 | 0 | NB |
| Stannic Oxide | 5.17 | 1.5 | 0 | NB |
| Antimony Trioxide | 5.0 | 12.0 | 131 | B |
| Ferrosoferric Oxide | 2.65 | 4.9 | 52 | B/SE |
| Ferrosoferric Oxide | 5.0 | 2.0 | 11 | SE |
| Cobalt Oxide | 5.0 | 4.9 | 34 | B/SE |
| Vanadium Pentoxide | 3.12 | 1.8 | 3 | SE |
| Vanadium Pentoxide | 5.0 | 5.9 | 40 | B/SE |
| Control | — | 12.0 | 121 | B |

The above runs were made for purposes of comparison of a variety of metal oxides with antimony oxide as a flame retardant on an equal weight basis and an equimolar basis. The only metal oxide which rendered its polymer blend nonburning was stannic oxide.

Additional similar blends and corresponding test sheets were prepared with variations in the weight ratios of components (A) and (B) and in the amounts of stannic oxide powder employed, and similar tests were performed with the following results:

TABLE II

| Metal Oxide | Parts, per 100 of Polymer | Polymer Blend, PVC/ABS Wt. Ratio | Burn Length (inches) | Burn Time (seconds) | Rating |
|---|---|---|---|---|---|
| None (control) | 0 | 0/100 | 12.0 | 117 | B |
| Stannic Oxide | 0.5 | 0/100 | 12.0 | 108 | B |
| Stannic Oxide | 1 | 0/100 | 12.0 | 107 | B |
| Stannic Oxide | 2 | 0/100 | 12.0 | 243 | B |
| Stannic Oxide | 4 | 0/100 | 12.0 | 240 | B |
| Stannic Oxide | 8 | 0/100 | 12.0 | 121 | B |
| None (control) | 0 | 25/75 | 12.0 | 240 | B |
| Stannic Oxide | 0.5 | 25/75 | 12.0 | 173 | B |
| Stannic Oxide | 1 | 25/75 | 12.0 | 169 | B |
| Stannic Oxide | 2 | 25/75 | 12.0 | 129 | B |
| Stannic Oxide | 4 | 25/75 | 12.0 | 140 | B |
| Stannic Oxide | 8 | 25/75 | 12.0 | 84 | B |
| None (control) | 0 | 40/60 | 12.0 | 157 | B |
| Stannic Oxide | 0.5 | 40/60 | 11.0 | 129 | B |
| Stannic Oxide | 1 | 40/60 | 5.5 | 47 | SE |
| Stannic Oxide | 2 | 40/60 | 5¾ | 33 | SE |
| Stannic Oxide | 4 | 40/60 | 2¾ | 13 | NB |
| Stannic Oxide | 8 | 40/60 | 2¼ | 12 | NB |
| Stannic Oxide | 12 | 40/60 | 2⅝ | 19 | NB/SE |
| None (control) | 0 | 50/50 | 8.6 | 104 | SE |
| Stannic Oxide | 0.5 | 50/50 | 8.8 | 55 | SE |
| Stannic Oxide | 1 | 50/50 | 5.0 | 46 | SE |
| Stannic Oxide | 2 | 50/50 | 3.0 | 11 | NB |
| Stannic Oxide | 4 | 50/50 | 2.6 | 10 | NB |
| Stannic Oxide | 8 | 50/50 | 2.1 | 0 | NB |
| None (control) | 0 | 60/40 | 2¾ | 14 | NB |
| Stannic Oxide | 0.5 | 60/40 | 2⅜ | 13 | NB |
| Stannic Oxide | 1 | 60/40 | 3½ | 20 | NB/SE |
| Stannic Oxide | 2 | 60/40 | 2¼ | 0 | NB |
| Stannic Oxide | 4 | 60/40 | 2 | 0 | NB |
| Stannic Oxide | 8 | 60/40 | 2⅛ | 0 | NB |
| Stannic Oxide | 12 | 60/40 | 1¾ | 0 | NB |

We claim:
1. A homogeneous blend consisting essentially of
A. ABS terpolymers prepared from monomers of which 20 to 40 weight percent is selected from the group consisting of butadiene-1,3 and isoprene, 15 to 35 weight percent is selected from the group consisting of acrylonitrile and methacrylonitrile and 35 to 55 weight percent is selected from the group consisting of styrene and alphamethylstyrene, said ABS terpolymers having a heat distortion temperature in the range of about 195° to 245°F., B. chlorinated saturated aliphatic hydrocarbon polymers containing an average of from about 0.4 to about 1 chlorine atom per carbon atom and having an intrinsic viscosity of from about 0.25 to 2.5, components (A) and (B) being in a weight ratio from about 60:40 to 40:60, and C. from 2 to 12 parts by weight per 100 parts by weight of total components (A) and (B) of stannic oxide.

2. A blend in accordance with claim 1 wherein the polymers of component (B) contain an average of from about 0.5 to 0.7 chlorine atom per carbon atom.

3. A blend in accordance with claim 2 wherein the polymers of component (B) have an intrinsic viscosity of from about 0.5 to 1.5.

4. A blend in accordance with claim 3 wherein the polymers of component (A) have a heat distortion temperature in the range of about 199° to 220°F.

5. A blend in accordance with claim 4 wherein the polymers of component (B) consist essentially of polyvinyl chloride.

6. A blend in accordance with claim 5 wherein the weight ratio of components (A) and (B) is about 50:50.

7. A blend in accordance with claim 4 wherein components (A), (B) and (C) comprise at least 94 weight percent of the total blend.

8. A blend in accordance with claim 7 containing about 0.5 to 1.5 parts by weight of stearic acid and about 1.0 to 4.5 parts by weight of heat stabilizer per 100 parts of polymer.

* * * * *